US011242427B2

(12) United States Patent
Nakajima et al.

(10) Patent No.: US 11,242,427 B2
(45) Date of Patent: Feb. 8, 2022

(54) STRUCTURAL ADHESIVE COMPOSITIONS

(71) Applicant: PPG Industries Ohio, Inc., Cleveland, OH (US)

(72) Inventors: Masayuki Nakajima, Wexford, PA (US); Hongying Zhou, Allison Park, PA (US); Tien-Chieh Chao, Mars, PA (US); Shanti Swarup, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 257 days.

(21) Appl. No.: 14/887,353

(22) Filed: Oct. 20, 2015

(65) Prior Publication Data

US 2017/0107318 A1 Apr. 20, 2017

(51) Int. Cl.
| | |
|---|---|
| *C08G 8/10* | (2006.01) |
| *C09J 161/06* | (2006.01) |
| *C08G 8/28* | (2006.01) |
| *C08K 5/17* | (2006.01) |
| *C08L 61/14* | (2006.01) |
| *C08G 14/06* | (2006.01) |
| *C08L 61/34* | (2006.01) |
| *C09J 161/14* | (2006.01) |
| *C09J 161/34* | (2006.01) |
| *C09J 163/00* | (2006.01) |
| *C08L 63/00* | (2006.01) |
| *C08G 59/62* | (2006.01) |
| *C08L 9/00* | (2006.01) |
| *C08L 61/06* | (2006.01) |
| *C09J 5/06* | (2006.01) |
| *C09J 109/00* | (2006.01) |

(52) U.S. Cl.
CPC .............. *C08G 8/10* (2013.01); *C08G 8/28* (2013.01); *C08G 14/06* (2013.01); *C08G 59/621* (2013.01); *C08K 5/17* (2013.01); *C08L 9/00* (2013.01); *C08L 61/06* (2013.01); *C08L 61/14* (2013.01); *C08L 61/34* (2013.01); *C08L 63/00* (2013.01); *C09J 5/06* (2013.01); *C09J 109/00* (2013.01); *C09J 161/06* (2013.01); *C09J 161/14* (2013.01); *C09J 161/34* (2013.01); *C09J 163/00* (2013.01); *C09J 2409/00* (2013.01)

(58) Field of Classification Search
None
See application file for complete search history.

(56) References Cited

U.S. PATENT DOCUMENTS

| | | | |
|---|---|---|---|
| 4,500,691 A | 2/1985 | Stockinger et al. | |
| 4,518,748 A * | 5/1985 | Haug | C08G 59/623 525/481 |
| 4,701,378 A * | 10/1987 | Bagga | C08G 59/18 156/307.3 |
| 4,775,728 A * | 10/1988 | Goel | C08G 59/18 525/109 |
| 4,866,133 A * | 9/1989 | Andrews | C08G 59/18 156/307.1 |
| 5,357,008 A | 10/1994 | Tsai et al. | |
| 6,506,821 B1 * | 1/2003 | Huver | C08G 59/066 523/404 |
| 6,602,924 B1 | 8/2003 | Chiang et al. | |
| 7,131,493 B2 | 11/2006 | Eoff et al. | |
| 8,796,361 B2 | 8/2014 | Asay et al. | |
| 9,000,120 B2 | 4/2015 | Ming et al. | |
| 2012/0128499 A1 | 5/2012 | Desai et al. | |
| 2012/0129980 A1 | 5/2012 | Desai et al. | |
| 2013/0225725 A1 * | 8/2013 | Campbell | C08G 59/4007 523/428 |
| 2014/0150970 A1 | 6/2014 | Desai et al. | |

FOREIGN PATENT DOCUMENTS

| | | |
|---|---|---|
| CA | 2918362 A1 | 1/2015 |
| CN | 102408680 | 4/2012 |
| CN | 104744653 A | 7/2015 |
| EP | 2840125 A1 | 2/2015 |
| GB | 1391420 A | 4/1975 |
| JP | 2012246424 | 12/2012 |

(Continued)

OTHER PUBLICATIONS

Huntsman, "Jeffamine D-230 Polyetheramine," pp. 1-2, (2007) (Year: 2007).*
Huntsman Technical Bulletin, "Jeffamine M-600," (2008) (Year: 2008).*
Untsman Technical Bulletin, "Jeffamine M-2070", (2018) (Year: 2018).*
ASTM D1876, Standard Test Method for Peel Resistance of Adhesives (T-Peel Test).
ISO 4587, Adhesives—Determination of tensile lap-shear strength of rigid-to-rigid boned assemblies.

(Continued)

*Primary Examiner* — Ha S Nguyen
(74) *Attorney, Agent, or Firm* — Ashley N. Crane; Alan G. Towner

(57) ABSTRACT

An adhesive composition is disclosed. The adhesive composition comprises an epoxy-containing component; rubber particles having a core-shell structure; and a curing component comprising a mixture of an amine-containing compound substantially free of hydroxyl functional groups and a polymeric phenol-containing compound, wherein the amine-containing compound comprises primary and/or secondary amino groups, and wherein the curing component chemically reacts with the epoxy-containing component upon activation from an external energy source. Also disclosed are methods of preparing the adhesive composition and for forming a bonded substrate with the adhesive composition. Further disclosed are curing components for an adhesive composition and methods of making the curing components.

37 Claims, No Drawings

(56) References Cited

FOREIGN PATENT DOCUMENTS

| WO | WO-9620970 A1 * | 7/1996 | ............. C08G 59/10 |
|---|---|---|---|
| WO | 2012000171 | 1/2012 | |
| WO | 2013142750 | 9/2013 | |
| WO | WO-2015077918 A1 * | 6/2015 | |
| WO | 2015145408 A1 | 10/2015 | |

OTHER PUBLICATIONS

ISO 13320, Particle size analysis—Laser diffraction methods, First edition, Oct. 1, 2009, Corrected version Dec. 1, 2009.
ISO 22412, Particle size analysis—Dynamic light scattering (DLS), First edition, May 1, 2008.

* cited by examiner

STRUCTURAL ADHESIVE COMPOSITIONS

FIELD OF THE INVENTION

The present invention relates to curing components comprising a mixture of an amine-containing compound and a polymeric phenol containing compound, and structural adhesive compositions comprising such curing components.

BACKGROUND INFORMATION

Structural adhesives are utilized in a wide variety of applications to bond together two or more substrate materials. For example, structural adhesives may be used for binding together automotive or industrial components.

The present invention is directed towards adhesive compositions that provide sufficient bond strength and are easy to apply for use in bonding together substrate materials.

SUMMARY OF THE INVENTION

The present invention is a curing component comprising: a mixture of an amine-containing compound substantially free of hydroxyl functional groups; and a polymeric phenol-containing compound, wherein the amine-containing compound comprises primary and/or secondary amino groups, and wherein the curing component reacts with an epoxy-containing component upon activation from an external energy source.

The present invention also is an adhesive composition comprising: an epoxy-containing component; rubber particles having a core-shell structure; and a curing component comprising a mixture of an amine-containing compound substantially free of hydroxyl functional groups, and a polymeric phenol-containing compound, wherein the amine-containing compound comprises primary and/or secondary amino groups, and wherein the curing component chemically reacts with the epoxy-containing component upon activation from an external energy source.

The present invention also is a method for making an adhesive composition comprising mixing, at a temperature of less than 50° C., an epoxy-containing component, rubber particles having a core-shell structure and a curing component that reacts with the epoxy-containing component upon activation from an external energy source.

The present invention also is a method for forming a bond between two substrates comprising: applying the adhesive composition to a first substrate; contacting a second substrate to the adhesive composition such that the adhesive composition is located between the first and second substrates; and applying an external energy source to cure the adhesive composition.

Also disclosed are methods of making the curing component.

DETAILED DESCRIPTION

For purposes of the following detailed description, it is to be understood that the invention may assume various alternative variations and step sequences, except where expressly specified to the contrary. Moreover, other than in any operating examples, or where otherwise indicated, all numbers such as those expressing values, amounts, percentages, ranges, subranges and fractions may be read as if prefaced by the word "about," even if the term does not expressly appear. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Where a closed or open-ended numerical range is described herein, all numbers, values, amounts, percentages, subranges and fractions within or encompassed by the numerical range are to be considered as being specifically included in and belonging to the original disclosure of this application as if these numbers, values, amounts, percentages, subranges and fractions had been explicitly written out in their entirety.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

As used herein, unless indicated otherwise, a plural term can encompass its singular counterpart and vice versa, unless indicated otherwise. For example, although reference is made herein to "an" amine-containing compound and "a" polymeric phenol-containing compound, a combination (i.e., a plurality) of these components can be used. In addition, in this application, the use of "or" means "and/or" unless specifically stated otherwise, even though "and/or" may be explicitly used in certain instances.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

As used herein, the terms "on," "onto," "applied on," "applied onto," "formed on," "deposited on," "deposited onto," mean formed, overlaid, deposited, or provided on but not necessarily in contact with the surface. For example, an adhesive composition "applied onto" a substrate does not preclude the presence of one or more other intervening coating layers of the same or different composition located between the adhesive composition and the substrate.

As used herein, "alkyl" refers to a hydrocarbon chain that may be linear or branched.

As used herein, "aromatic" refers to a hydrocarbon having a delocalized conjugated π-system with alternating double and single bonds between carbon atoms forming one or more coplanar hydrocarbon rings.

As used herein, "cycloaliphatic" refers to a hydrocarbon that comprises one or more hydrocarbon rings that are not aromatic.

As used herein, "divalent" refers to a radical/molecule part having a valency of two, i.e. two binding sites.

As defined herein, a "1K" or "one-component" adhesive composition, is a composition in which all of the ingredients may be premixed and stored and wherein the reactive components do not readily react at ambient or slightly thermal conditions, but instead only react upon activation by an external energy source. In the absence of activation from the external energy source, the composition will remain largely unreacted for long periods of time, for example, the viscosity of the adhesive composition may double over a period of at least two-months in the absence of activation from an external energy source. External energy sources that may be used to promote the curing reaction include, for example, radiation (i.e., actinic radiation such as ultraviolet light) and/or heat. As further defined herein, ambient conditions generally refer to 25° C., while slightly thermal conditions are temperatures that are slightly above ambient temperature but are generally below the curing temperature for the adhesive composition (i.e. in other words, at temperatures and humidity conditions below which the reactive components will readily react and cure) such as a temperature ranging from 25° C. to 30° C.

As used herein, the term "polymer" is meant to refer to prepolymers, oligomers, homopolymers, copolymers, and blends or mixtures thereof.

As used herein, the term "molecular weight" means the theoretical number average molecular weight ($M_n$).

As used herein, unless indicated otherwise, the term "substantially free" means that a particular material is not purposefully added to a mixture or composition, respectively, and is only present as an impurity in a trace amount of less than 1% by weight based on a total weight of the mixture or composition, respectively. As used herein, unless indicated otherwise, the term "completely free" means that a mixture or composition, respectively, does not comprise a particular material, i.e., the mixture or composition comprises 0% by weight of such material.

The present invention is directed to a curing component comprising, or in some cases consisting of, or in some cases consisting essentially of, a mixture of an amine-containing compound substantially free of hydroxyl functional groups, and a polymeric phenol-containing compound, wherein the amine-containing compound comprises primary and/or secondary amino groups, and wherein the curing component reacts with an epoxy-containing component upon activation from an external energy source, such as, for example, applying heat at a temperature of at least 100° C. According to the present invention, the amine-containing compound may be blocked by the polymeric phenol-containing compound in the absence of an external energy source. Thus, as far as the curing component of the present invention is concerned, the term mixture is be understood to also include any adducts, ion pairs and complexes formed from the amine-containing compound substantially free of hydroxyl functional groups and the polymeric phenol-containing compound. Upon application of the external energy source, the curing component may react with the epoxy-containing component as a result of the removal of the polymeric phenol-containing compound that serves as a blocking group for the amine-containing compound. Optionally, the amine-containing compound may be completely free of hydroxyl functional groups.

Useful amine-containing compounds that may be used to form the curing component include compounds comprising primary amino groups, secondary amino groups, or combinations thereof. Further functional groups, e.g. ether groups, may be present in the amine-containing compound as well, unless stated otherwise. Useful amine-containing compounds that can be used include diamines, triamines, tetramines, and higher functional polyamines.

According to the present invention, the amine-containing compound may be substantially free, or in some cases completely free, of tertiary amine. An amine-containing compound is substantially free of tertiary amine if impurities comprising a tertiary amine are present in an amount of less than 2% by weight, based on a total weight of the amine-containing compound.

According to the present invention, the amine-containing compound may be substantially free, or in some cases completely free, of amide.

As described above, the curing component may comprise an amine-containing compound that is substantially free of hydroxyl functional groups. Non-limiting examples of the amine-containing compound used according to the present invention can be represented by any of the following Formulas (I) to (VI). According to Formula (I) of the present invention the amine-containing compound may comprise or represent:

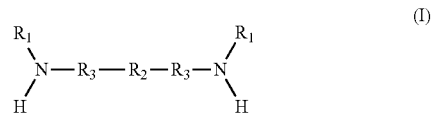

(I)

wherein each $R_1$ is independently H or a $C_1$-$C_{18}$ alkyl group; $R_2$ is oxygen, $C_1$-$C_{12}$ divalent alkyl, divalent aromatic, or divalent cycloaliphatic; each $R_3$ is independently absent, $C_1$-$C_4$ divalent alkyl, divalent aromatic, or divalent cycloaliphatic. As used herein, an $R_3$ that is "absent" means that specific $R_3$ is not present in Formula (I) and that $R_2$ is bound directly to the terminal nitrogen.

Suitable amine-containing compounds represented by Formula (I) include, but are not limited to, alkyl diamines such as 1,2-diaminoethane, 1,3-diaminopropane, 1,4-diaminobutane, neopentyldiamine, 1,8-diaminooctane, 1,10-diaminodecane, 1,12-diaminododecane and the like; etherdiamines such as 1,5-diamino-3-oxapentane and the like; cycloaliphatic diamines such as 1,2-bis(aminomethyl)cyclohexane, 1,3-bis(aminomethyl)cyclohexane, 1,4-bis(aminomethyl) cyclohexane, bis-(p-aminocyclohexyl)methane (PACM), bis(aminomethyl)norbornane, 4,8-diamino-tricyclo[5.2.1.0]decane, isophorone diamine and the like; aromatic alkyl diamines such as 1,3-bis(aminomethyl)benzene (m-xylenediamine or m-xylylenediamine) and 1,4-bis(aminomethyl)benzene (p-xylenediamine or p-xylylenediamine).

According to Formula (II) of the present invention the amine-containing compound may comprise or represent:

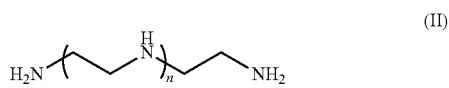

(II)

wherein n=1, 2 or 3.

Suitable amine-containing compounds represented by Formula (II) include, but are not limited to, diethylenetriamine, triethylenetetramine and tetraethylenepentamine.

According to Formula (III) of the present invention the amine-containing compound may comprise or represent:

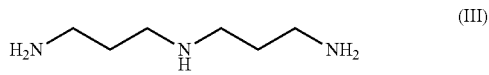

(III)

Suitable amine-containing compounds represented by Formula (III) include dipropylenetriamine.

The amine-containing compound may comprise a polyetheramine, such as one characterized by propylene oxide, ethylene oxide, or mixed propylene oxide and ethylene oxide repeating units in their respective structures, such as, for example, one of the Jeffamine series products. Examples of such polyetheramines include aminated propoxylated pentaerythritols, such as Jeffamine XTJ-616, and those represented by Formulas (IV) through (VI).

According to Formula (IV) of the present invention the amine-containing compound may comprise or represent:

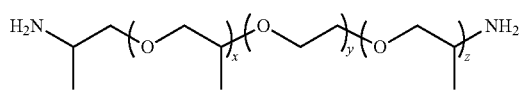

wherein y=0-39, x+z=1-68.

Suitable amine-containing compounds represented by Formula (IV) include, but are not limited to, amine-terminated polyethylene glycol such as Huntsman Corporation Jeffamine ED series, such as Jeffamine HK-511, Jeffamine ED-600, Jeffamine ED-900 and Jeffamine ED-2003, and amine-terminated polypropylene glycol such as Huntsman Corporation Jeffamine D series, such as Jeffamine D-230, Jeffamine D-400, Jeffamine D-2000 and Jeffamine D-4000.

According to Formula (V) of the present invention the amine-containing compound may comprise or represent:

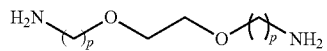

wherein each p independently is 2 or 3.

Suitable amine-containing compounds represented by Formula (V) include, but are not limited to, amine-terminated polyethylene glycol based diamine, such as Huntsman Corporation Jeffamine EDR series, such as Jeffamine EDR-148 and Jeffamine EDR-176.

According to Formula (VI) of the present invention the amine-containing compound may comprise or represent:

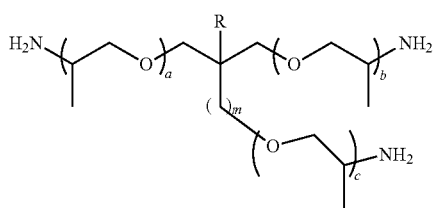

wherein R is H or $C_2H_5$, m=0 or 1, a+b+c=5-85.

Suitable amine-containing compounds represented by Formula (VI) include, but are not limited to, amine-terminated propoxylated trimethylolpropane or glycerol, such as Huntsman Corporation Jeffamine T series, such as Jeffamine T-403, Jeffamine T-3000 and Jeffamine T-5000.

According to the present invention, the amine equivalent weight of the amine-containing compound of the curing component may be at least 30, such as at least 100, such as at least 200, such as at least 1000, and in some cases may be no more than 2,000, such as no more than 1,700, such as no more than 1,000, such as no more than 200, such as no more than 100. According to the present invention, the amine equivalent weight of the amine-containing compound of the curing component can range from 30 to 2,000, such as from 100 to 1,700, such as from 200 to 1,000. As used herein, the "amine equivalent weight" is determined by dividing the theoretical molecular weight of the amine-containing compound by the number of amino groups present in the amine-containing compound.

According to the present invention, the molecular weight of the amine-containing compound of the curing component may be at least 60 g/mol, such as at least 200 g/mol, such as at least 300 g/mol, such as at least 400 g/mol, such as at least 600 g/mol, such as at least 2,000 g/mol, such as at least 3,400 g/mol, such as at least 5,400 g/mol, and in some cases may be no more than 6,000 g/mol, such as no more than 5,400 g/mol, such as no more than 3,400 g/mol, such as no more than 3,000 g/mol, such as no more than 2,000 g/mol, such as no more than 600 g/mol, such as no more than 400 g/mol, such as no more than 300 g/mol, such as no more than 200 g/mol, such as no more than 100 g/mol. According to the present invention, the molecular weight of the amine-containing compound of the curing component can range from 60 g/mol to 6,000 g/mol, such as from 200 g/mol to 5,400 g/mol, such as from 300 g/mol to 3,400 g/mol, such as from 400 g/mol to 3,000 g/mol, such as from 600 g/mol to 2,000 g/mol.

As stated above, the curing component of the present invention also may comprise a polymeric phenol-containing compound. In terms of the present invention, a polymeric phenol-containing compound is to be understood as a polymer obtainable from monomers comprising at least one hydroxyl group bonded directly to an aromatic hydrocarbon, wherein at least some of these hydroxyl groups are also present in the polymer. Suitable polymeric phenol-containing compounds may be comprised of monomers (or residues thereof) including resorcinol; catechol; hydroquinone; bis(4-hydroxyphenyl)-2,2-propane, i.e., bisphenol A; bis(4-hydroxyphenyl)-1,1-isobutane; 4,4-dihydroxybenzophenone; bis(4-hydroxyphenol)-1,1-ethane; bis(2-hydroxyphenyl)-methane and 1,5-hydroxynaphthalene.

Other suitable polymeric phenol-containing compounds may be naturally occurring compounds such as lignin, rosin and cardanol.

Other suitable polymeric phenol-containing compounds may comprise a phenol formaldehyde resin such as a novolac resin.

According to the present invention, the phenol-equivalent weight of the polymeric phenol-containing compound of the curing component may be at least 62, such as at least 124, such as at least 186, and in some cases may be no more than 500, such as no more than 200, such as no more than 100. According to the present invention, the phenol-equivalent weight of the polymeric phenol-containing compound of the curing component can range from 62 to 500, such as from 124 to 200. As used herein, the "phenol equivalent weight" is determined by dividing the molecular weight of the polymeric phenol-containing compound by the number of phenolic hydroxyl groups present in the compound, wherein the term "phenolic hydroxyl group" refers to any hydroxyl group bonded directly to an aromatic hydrocarbon group.

According to the present invention, the molecular weight of the polymeric phenol-containing compound of the curing component may be at least 200 g/mol, such as at least 1,000 g/mol, such as at least 4,000 g/mol, such as at least 5,000 g/mol, such as at least 8,000 g/mol, such as at least 10,000 g/mol, and in some cases may be no more than 20,000 g/mol, such as no more than 10,000 g/mol, such as no more than 8,000 g/mol, such as no more than 7,000 g/mol, such as no more than 4,000 g/mol, such as no more than 1,000 g/mol. According to the present invention, the molecular weight of the polymeric phenol-containing compound of the curing component can range from 200 g/mol to 20,000 g/mol, such as from 1,000 g/mol to 10,000 g/mol, such as from 4,000 g/mol to 8,000 g/mol, such as from 5,000 g/mol to 7,000 g/mol.

According to the present invention, the amine-containing compound and the polymeric phenol-containing compound may be present in the curing component in a molar ratio of at least 1:3, such as at least 1:2, such as at least 1:1, such as at least 1.5:1, such as at least 2:1, and in some cases may be present in the curing component in a molar ratio of no more than 3:1, such as no more than 2:1, such as no more than 1.5:1, such as no more than 1:1, such as no more than 1:1.5, such as no more than 1:2. According to the present invention, the amine-containing compound and the polymeric phenol-containing compound may be present in the curing component in a molar ratio of from 3:1 to 1:3, such as from 2:1 to 1:2, such as from 1.5:1 to 1:1.5.

According to the present invention, the curing component may milled to a desired particle size, such as a $D_{97}$ particle size of no more than 500 μm, such as no more than 100 μm, such as no more than 50 μm, such as no more than 20 μm, such as no more than 10 μm. For example, an air classifying mill may be utilized to mill the curing component. An air classifying mill has an internal classifier that controls the outlet of particles from the mill that are under a desired size. Particles that reach the classifier above that desired size recirculate back into a grinding zone of the mill for further size reduction. The size of the milled particles is usually given as an upper limit of the particle size distribution. For example, a $D_{97}$ particle size means 97% of the particles of the distribution are smaller than the $D_{97}$ value, e.g., a $D_{97}$ particle size of 10 um means that 97% of the particles in the particle distribution are smaller than 10 μm.

According to the present invention, the curing component may further comprise a solvent, such as an alcohol, methyl isobutyl ketone, propylene glycol methyl ether, or propylene glycol propyl ether. The solvent may be present in the curing component in an amount from 5 to 10% by weight based on the total composition weight of the curing component. Alternatively, according to the present invention, the curing component may be substantially free, or in some cases completely free, of solvent. A curing component is substantially free of solvent if solvent is present in an amount of less than 5% by weight, based on the total composition weight of the curing component.

The present invention may also be a method for preparing a curing component comprising, or in some cases consisting of, or in some cases consisting essentially of, a mixture of an amine containing compound that is substantially free of hydroxyl functional groups, and a polymeric phenol-containing compound, the method comprising mixing the amine-containing compound with the polymeric phenol-containing compound in the molar ratios described above to form an ion pair. Optionally, the curing component may be substantially free of tertiary amine.

The present invention is further directed to a one-component adhesive composition comprising, or in some cases consisting of, or in some cases consisting essentially of, an epoxy-containing component; rubber particles having a core-shell structure; and any of the curing components described above. It will be appreciated that the curing component is chosen so as to chemically react with the epoxy-containing component upon activation from an external energy source.

Useful epoxy-containing components that can be used include polyepoxides, epoxy adducts, or combinations thereof. Suitable polyepoxides include polyglycidyl ethers of Bisphenol A, such as Epon® 828 and 1001 epoxy resins, and Bisphenol F diepoxides, such as Epon® 862, which are commercially available from Hexion Specialty Chemicals, Inc. Other useful polyepoxides include polyglycidyl ethers of polyhydric alcohols, polyglycidyl esters of polycarboxylic acids, polyepoxides that are derived from the epoxidation of an olefinically unsaturated alicyclic compound, polyepoxides containing oxyalkylene groups in the epoxy molecule, and epoxy novolac resins. Still other non-limiting epoxy compounds include epoxidized Bisphenol A novolacs, epoxidized phenolic novolacs, epoxidized cresylic novolac, and triglycidyl p-aminophenol bismaleiimide.

Other suitable epoxy-containing components include epoxy-adducts such as epoxy polyesters formed as the reaction product of reactants comprising an epoxy-containing compound, a polyol and an anhydride, as described in U.S. Pat. No. 8,796,361, col. 3, line 42 through col. 4, line 65, the cited portion of which is incorporated herein by reference.

According to the present invention, the epoxy-containing component may be present in the adhesive composition in an amount of at least 50% by weight based on the total composition weight, such as at least 60%, such as at least 75%, such as at least 85%, and in some cases may be present in the adhesive composition in an amount of no more than 90% by weight based on the total composition weight, such as no more than 80%, such no more than 70%. According to the present invention, the epoxy-containing component may be present in the adhesive composition in an amount of from 50% to 90% by weight based on the total composition weight, such as from 60% to 80%.

According to the present invention, the epoxy equivalent weight of the epoxy-containing component of the adhesive composition may be at least 99, such as at least 180, such as at least 520, such as at least 1,000, and in some cases may be no more than 2,000, such as no more than 1,000, such as no more than 560, such as no more than 200. According to the present invention, the epoxy equivalent weight of the epoxy-containing component of the adhesive composition can range from 99 to 2,000, such as from 180 to 1,000, such as from 520 to 560. As used herein, the "epoxy equivalent weight" is determined by dividing the molecular weight of the epoxy-containing component by the number of epoxy groups present in the epoxy-containing component.

According to the present invention, the molecular weight of the epoxy-containing component of the adhesive composition may be at least 198 g/mol, such as at least 222 g/mol, such as at least 370 g/mol, such as at least 1,000 g/mol, and in some cases no more than 20,000 g/mol, such as no more than 4,000 g/mol, such as no more than 2,000 g/mol, such as no more than 1,100 g/mol, such as no more than 400 g/mol, such as no more than 300 g/mol. According to the present invention, the molecular weight of the epoxy-containing component of the adhesive composition can range from 198 g/mol to 20,000 g/mol, such as from 222 g/mol to 4,000 g/mol, such as from 370 g/mol to 2,000 g/mol, such as from 1,000 g/mol to 1,100 g/mol.

As stated above, the adhesive composition also may comprise rubber particles having a core-shell structure. Suitable core-shell rubber particles may be comprised of butadiene rubber or other synthetic rubbers, such as styrene-butadiene and acrylonitrile-butadiene and the like. The type of synthetic rubber and the rubber concentration is not limited as long as the particle size falls within the specified range as illustrated below.

According to the present invention, the average particle size of the rubber particles may be from 0.02 to 500 microns (20 nm to 500,000 nm), for example, the reported particle size for rubber particles provided by Kanekea Texas Corporation, as measured by standard techniques known in the industry, such as, for example, according to ISO 13320 and ISO 22412.

According to the present invention, the core-shell rubber particles may optionally be included in an epoxy carrier resin for introduction into the adhesive composition. Suitable finely dispersed core-shell rubber particles in an average particle size ranging from 50 nm to 250 nm may be master-batched in epoxy resin such as aromatic epoxides, phenolic novolac epoxy resin, bisphenol A and/or bisphenol F diepoxide, and/or aliphatic epoxides, which include cycloaliphatic epoxides, at concentrations ranging from 5% to 40% rubber particles by weight based on the total weight of the rubber dispersion, such as from 20% to 35%. Suitable epoxy resins may also include a mixture of epoxy resins. When utilized, the epoxy carrier resin may be an epoxy-containing component of the present invention such that the weight of the epoxy-containing component present in the structural adhesive composition includes the weight of the epoxy carrier resin.

Exemplary non-limiting commercial core-shell rubber particle products using poly(butadiene) rubber particles that may be utilized in the adhesive composition include a core-shell poly(butadiene) rubber dispersion (25% rubber by weight) in bisphenol F (commercially available as Kane Ace MX 136), a core-shell poly(butadiene) rubber dispersion (33% rubber by weight) in Epon 828 (commercially available as Kane Ace MX 153), a core-shell poly(butadiene) rubber dispersion (37% rubber by weight) in bisphenol A (commercially available as Kane Ace MX 257), and a core-shell poly(butadiene) rubber dispersion (37% rubber by weight) in bisphenol F (commercially available as Kane Ace MX 267), each available from Kaneka Texas Corporation.

Exemplary non-limiting commercial core-shell rubber particle products using styrene-butadiene rubber particles that may be utilized in the adhesive composition include a core-shell styrene-butadiene rubber dispersion (33% rubber by weight) in low viscosity bisphenol A (commercially available as Kane Ace MX 113), a core-shell styrene-butadiene rubber dispersion (25% rubber by weight) in bisphenol A (commercially available as Kane Ace MX 125), a core-shell styrene-butadiene rubber dispersion (25% rubber by weight) in D.E.N.™-438 phenolic novolac epoxy (commercially available as Kane Ace MX 215), a core-shell styrene-butadiene rubber dispersion (25% rubber by weight) in Araldite® MY-721 multi-functional epoxy (commercially available as Kane Ace MX 416), a core-shell styrene-butadiene rubber dispersion (25% rubber by weight) in MY-0510 multi-functional epoxy (commercially available as Kane Ace MX 451), a core-shell styrene-butadiene rubber dispersion (25% rubber by weight) in Syna Epoxy 21 Cyclo-aliphatic Epoxy from Synasia (commercially available as Kane Ace MX 551), and a core-shell styrene-butadiene rubber dispersion (25% rubber by weight) in polypropylene glycol (MW 400) (commercially available as Kane Ace MX 715), each available from Kaneka Texas Corporation.

The rubber particles may be present in the adhesive composition in an amount of at least 1% by weight based on the total composition weight, such as at least 6%, such as at least 11%, and in some cases may be present in the adhesive composition in an amount of no more than 42% by weight based on the total composition weight, such as no more than 37%, such as no more than 32%. According to the present invention, the rubber particles having a core-shell structure may be present in the adhesive composition in an amount of from 1% to 42% by weight based on the total composition weight, such as from 6% to 37%, such as from 11% to 32%.

According to the present invention, the curing component comprising a mixture of an amine-containing compound substantially free of hydroxyl functional groups and a polymeric phenol-containing compound in the adhesive composition includes the curing component described above and therefore is not repeated here.

According to the present invention, the amount of curing component included in the adhesive composition of the present invention utilized to achieve such improved mechanical properties may be at least 0.2% by weight based on the total composition weight, such as at least 1%, such as at least 3%, such as at least 7%, and in some cases may be no more than 15% by weight based on the total composition weight, such as no more than 10%, such as no more than 7%, such as no more than 3%. According to the present invention, the amount of curing component included in the adhesive composition of the present invention utilized to achieve such improved mechanical properties can range from 0.2% to 15% by weight based on the total composition weight, such as from 1% to 10%, such as from 3% to 7%.

The introduction of the curing component in the amounts disclosed herein into the adhesive compositions of the present invention may provide improved mechanical properties to the joint formed between two substrates, such as T-peel and/or lap shear.

According to the present invention, the adhesive composition optionally may further comprise a secondary latent curing catalyst.

Useful secondary latent curing catalysts may comprise amidoamine or polyamide catalysts, such as, for example, one of the Ancamide® products available from Air Products, amine, dihydrazide, or dicyandiamide adducts and complexes, such as, for example, one of the Ajicure® products available from Ajinomoto Fine Techno Company, dicyandiamide (A.K.A. Dyhard®) available from Alz Chem, 3,4-dichlorophenyl-N,N-dimethylurea (A.K.A. Diuron) available from Alz Chem, or combinations thereof.

According to the present invention, when utilized, the secondary latent curing catalyst may be present in the adhesive composition in an amount of at least 0.1% by weight based on the total composition weight, such as at least 2%, such as at least 5%, and in some cases may be present in the adhesive composition in an amount of no more than 10% by weight based on the total composition weight, such as no more than 5%, such as no more than 2%. According to the present invention, when utilized, the secondary latent curing catalyst may be present in the adhesive composition in an amount from 0.1% to 10% by weight based on the total composition weight, such as from 2% to 5%.

According to the present invention, the adhesive composition may be substantially free, or in some cases completely free, of solvent. As used herein, an adhesive composition is substantially free of solvent if impurities comprising solvent are present in an amount of less than 5% by weight, based on a total weight of the adhesive composition.

Without intending to be bound by any particular theory, it is believed that any ion pair, complex, adduct or the like formed from the mixture of the amine-containing compound and the polymeric phenol-containing compound in the curing component may decompose to these constituent components upon activation from an external energy source, such as thermal heating to a temperature sufficient to cure the adhesive composition (at least 100° C.). The amine-containing compound may then react with the epoxy-containing component and extend into the polymeric backbone of the cured adhesive composition, wherein, upon formation of a covalent bond with the epoxy-containing component, primary amino groups of the amine-containing compound are converted into secondary amino groups, and secondary amino groups of the amine-containing compound are converted into tertiary amino groups. Once converted, the newly formed tertiary amine acts as a catalyst to cure the adhesive composition and may extend into the polymeric backbone of the cured adhesive composition. The polymeric phenol-containing compound may react with the epoxy compound and extend into the polymeric backbone of the cured adhesive composition in the presence of the newly formed tertiary amine as well. As used herein, a compound extends into the polymeric backbone of the cured adhesive composition if it reacts with and becomes incorporated into the polymer formed during cure.

According to the present invention, reinforcement fillers may be added to the adhesive composition. Useful reinforcement fillers that may be introduced to the adhesive composition to provide improved mechanical properties include fibrous materials such as fiberglass, fibrous titanium dioxide, whisker type calcium carbonate (aragonite), and carbon fiber (which includes graphite and carbon nanotubes). In addition, fiber glass ground to 5 microns or wider and to 50 microns or longer may also provide additional tensile strength. Such reinforcement fillers, if utilized, may comprise from 0.5% to 25% by weight based on the total composition weight.

Optionally, according to the present invention, additional fillers, thixotropes, colorants, tints and/or other materials also may be added to the adhesive composition.

Useful thixotropes that may be used include untreated fumed silica and treated fumed silica, Castor wax, clay, organo clay and combinations thereof. In addition, fibers such as synthetic fibers like Aramid fiber and Kevlar fiber, acrylic fibers, and/or engineered cellulose fiber may also be utilized.

Useful colorants or tints may include red iron pigment, titanium dioxide, calcium carbonate, and phthalocyanine blue and combinations thereof.

Useful fillers that may be used in conjunction with thixotropes may include inorganic fillers such as inorganic clay or silica and combinations thereof.

Exemplary other materials that may be utilized include, for example, calcium oxide and carbon black and combinations thereof.

The present invention may also be a method for preparing an adhesive composition comprising, or in some cases consisting of, or in some cases consisting essentially of, an epoxy-containing component, rubber particles having a core-shell structure, and any of the curing components described above, the method comprising, or in some cases consisting of, or in some cases consisting essentially of, mixing the epoxy-containing component, the rubber particles having a core-shell structure and the curing component at a temperature of less than 50° C., such as from 0° C. to 50° C., such as from 25° C. to 40° C.

The present invention is also directed to a method for forming a bond between two substrates comprising, or in some cases consisting of, or in some cases consisting essentially of, applying the adhesive composition described above to a first substrate; contacting a second substrate to the adhesive composition such that the adhesive composition is located between the first substrate and the second substrate; and curing the adhesive composition, such as, for example, by applying an external energy source.

The adhesive composition described above may be applied alone or as part of an adhesive system that can be deposited in a number of different ways onto a number of different substrates. The adhesive system may comprise a number of the same or different adhesive layers. An adhesive layer is typically formed when an adhesive composition that is deposited onto the substrate is at least partially cured by methods known to those of ordinary skill in the art (e.g., by exposure to thermal heating).

The adhesive composition can be applied to the surface of a substrate in any number of different ways, non-limiting examples of which include brushes, rollers, films, pellets, spray guns and applicator guns.

After application to the substrate, the adhesive composition can be cured, such as by baking and/or curing at elevated temperature, such as at a temperature of at least 100° C., such as at least 120° C., such as at least 125° C., such as at least 130° C., and in some cases at a temperature of no more than 200° C., such as no more than 180° C., such as no more than 170° C., such as no more than 165° C., and in some cases at a temperature of from 100° C. to 200° C., from 120° C. to 180° C., from 125° C. to 170° C., from 130° C. to 165° C., and for any desired time period (e.g., from 5 minutes to 1 hour) sufficient to at least partially cure the adhesive composition on the substrate(s).

After the adhesive composition is applied to a substrate and at least partially cured, the bonded substrate(s) may demonstrate a lap shear of at least 16 MPa as measured according to test method ISO 4587 by an Instron model 5567 in tensile mode, such as at least 18 MPa, such as at least 22 MPa, such as at least 24 MPa.

After the adhesive composition is applied to a substrate and at least partially cured, the bonded substrate(s) may demonstrate a T-peel of at least 4 N/mm for hot dip galvanized-steel substrates, such as a least 7 N/mm, such as at least 8 N/mm, such as at least 9 N/mm, and at least 4.0 N/mm for electro-galvanized steel substrates, such as at least 8.0 N/mm, such as at least 9.0 N/mm, such as at least 10.0 N/mm, pulled apart by an Instron 5567 at a rate of 50 mm per minute according to ASTM D1876 standard test method and calculated by the Instron 5567.

As stated above, the present disclosure is directed to adhesive compositions that are used to bond together two substrate materials for a wide variety of potential applications in which the bond between the substrate materials provides particular mechanical properties related to lap shear strength and/or T-peel strength. The adhesive composition may be applied to either one or both of the substrate materials being bonded such as, by way of non-limiting example, components of an automobile frame. The pieces are aligned and pressure and/or spacers may be added to control bond thickness. The adhesive composition may be cured using an external source such as an oven (or other thermal means) or through the use of actinic radiation (UV light, etc.).

Suitable substrate materials that may be bonded by the adhesive compositions of the present invention include, but are not limited to, materials such as metals or metal alloys, glass, natural materials such as wood, polymeric materials such as hard plastics, or composite materials. The adhesives of the present invention are particularly suitable for use in various automotive or industrial applications.

Illustrating the invention are the following examples that are not to be considered as limiting the invention to their details. All parts and percentages in the examples, as well as throughout the specification, are by weight unless otherwise indicated.

EXAMPLES

Curing Component Preparation

Example 1

Synthesis of Novolac resin blocked heat activated m-xylenediamine curing component: Into a 500-milliliter, 4-necked kettle equipped with a stirrer, a condenser, a nitrogen inlet, and a thermocouple in a heating mantle, was charged 44.0 grams of FRJ-425 (a phenol formaldehyde novolac resin commercially available from SI Group) and heated to 160° C. to become a liquid. 17.6 grams of m-xylenediamine were added into the reaction mixture drop wise and followed with 2 grams of Dowanol PM (a glycol ether commercially available from Dow Chemical Co.) as a rinse for m-xylenediamine. After addition, the reaction mixture was held at 160° C. for 30 minutes. After holding, the liquid was poured out onto aluminum foil and a solid formed during cooling. The solid was ground into fine powder by using an Air Classifying Mill manufactured by MIKRO (<100 µm).

Example 2

Synthesis of Novolac resin blocked heat activated m-xylenediamine curing component: Into a 500-milliliter, 4-necked kettle equipped with a stirrer, a condenser, a nitrogen inlet, and a thermocouple in a heating mantle, was charged 44.0 grams of FRJ-425 and heated to 160° C. to become a liquid. 23.4 grams of m-xylenediamine were added into the reaction mixture drop wise and followed with 2 grams of Dowanol PM as a rinse for m-xylenediamine. After addition, the reaction mixture was held at 160° C. for 30 minutes. After holding, the liquid was poured out onto aluminum foil and a solid formed during cooling. The solid was ground into fine powder by using an Air Classifying Mill manufactured by MIKRO (<100 µm).

Example 3

Synthesis of Novolac resin blocked heat activated m-xylenediamine curing component: Into a 500-milliliter, 4-necked kettle equipped with a stirrer, a condenser, a nitrogen inlet, and a thermocouple in a heating mantle, was charged 44.0 grams of FRJ-425 and heated to 160° C. to become a liquid. 11.7 grams of m-xylenediamine were added into the reaction mixture drop wise and followed with 2 grams of Dowanol PM as a rinse for m-xylenediamine. After addition, the reaction mixture was held at 160° C. for 30 minutes. After holding, the liquid was poured out onto aluminum foil and a solid formed during cooling. The solid was ground into fine powder by using an Air Classifying Mill manufactured by MIKRO (<100 µm).

Example 4

Synthesis of Novolac resin blocked heat activated diethylenetriamine curing component: Into a 500-milliliter, 4-necked kettle equipped with a stirrer, a condenser, a nitrogen inlet, and a thermocouple in a heating mantle, was charged 44.0 grams of FRJ-425 and heated to 160° C. to become a liquid. 14.8 grams of diethylenetriamine were added into the reaction mixture drop wise and followed with 2 grams of Dowanol PM as a rinse for diethylenetriamine. After addition, the reaction mixture was held at 160° C. for 30 minutes. After holding, the liquid was poured out onto aluminum foil and a solid formed during cooling. The solid was ground into fine powder by using an Air Classifying Mill manufactured by MIKRO (<100 µm).

Example 5

Synthesis of Novolac resin blocked heat activated Jeffamine D2000 curing component: Into a 500-milliliter, 4-necked kettle equipped with a stirrer, a condenser, a nitrogen inlet, and a thermocouple in a heating mantle, was charged 44.0 grams of FRJ-425 and 285.1 grams of Jeffamine D2000. The reaction mixture was heated to 100° C. and held for 30 minutes. Then the reaction mixture was heated to 140° C. and held for 30 minutes. After holding, the reaction mixture was cooled to 80° C. and poured out as liquid.

Example 6

Synthesis of Novolac resin blocked heat activated 4,4'-methylenebis(cyclohexylamine) curing component: Into a 500-milliliter, 4-necked kettle equipped with a stirrer, a condenser, a nitrogen inlet, and a thermocouple in a heating mantle, was charged 66.0 grams of FRJ-425 and heated to 160° C. to become a liquid. 45.2 grams of 4,4'-methylenebis (cyclohexylamine) were added into the reaction mixture drop wise and followed with 3 grams of Dowanol PM as a rinse for 4,4'-methylenebis(cyclohexylamine). After addition, the reaction mixture was held at 160° C. for 30 minutes. After holding, the liquid was poured out onto aluminum foil and a solid formed during cooling. The solid was ground into fine powder by using an Air Classifying Mill manufactured by MIKRO (<100 µm).

Comparative Example 7

Synthesis of Novolac resin blocked heat activated 2,4,6-tris(dimethylaminomethyl)phenol curing component: Into a 500-milliliter, 4-necked kettle equipped with a stirrer, a condenser, a nitrogen inlet, and a thermocouple in a heating mantle, was charged 44.0 grams of FRJ-425 and 220 grams of Dowanol PM. The mixture was stirred until completely dissolved. 55.0 grams of 2,4,6-tris(dimethylaminomethyl) phenol were added into the reaction mixture drop wise and followed with 18 grams of Dowanol PM as a rinse for 2,4,6-tris(dimethylaminomethyl)phenol. After addition, the reaction mixture was heated to 120° C. and held for 3 hours. After holding, the reaction mixture was concentrated by evaporation under vacuum. The residual liquid was poured out onto aluminum foil and a solid formed during cooling. The solid was ground into fine powder by using an Air Classifying Mill manufactured by MIKRO (<100 µm).

Example 8

Synthesis of Novolac resin blocked heat activated m-xylenediamine curing component: Into a 500-milliliter, 4-necked kettle equipped with a stirrer, a condenser, a nitrogen inlet, and a thermocouple in a heating mantle, was charged 88.0 grams of FRJ-425 and heated to 160° C. to become a liquid. 31.2 grams of m-xylenediamine were added into the reaction mixture dropwise and followed with 4 grams of Dowanol PM as a rinse for m-xylylenediamine. After addition, the reaction mixture was held at 160° C. for 30 minutes. After holding, the liquid was poured out onto aluminum foil and a solid formed during cooling. The solid was ground into fine powder by using an Air Classifier Mill (ACM) manufactured by MIKRO (<100 μm).

Adhesive Composition Preparation

The structural adhesive compositions were prepared by mixing the ingredients listed in Table 1. Mixing was carried out at a temperature between 20° C. and 40° C. by using DAC600 FVZ Speedmixer™ to form the adhesive composition.

for each bond assembly. Uniformity of bond thickness was insured by adding 0.25 mm (10 mil) glass spacer beads. Spacer beads were sprinkled evenly over the material to cover no more than 5% of the total bond area. The other test coupon was placed on the bond area and spring loaded clips, such as Binder Clips from Office Max or Mini Spring Clamp from Home Depot, were attached, one to each side of the bond, to hold the assembly together during bake. Excess squeeze out was removed with a spatula before baking. Bond assemblies were cured as specified above, and after cooling, remaining excess was sanded. Bonds were conditioned at 20° C. to 30° C. for at least 24 hours. Bonds were pulled apart using an Instron model 5567 in tensile mode.

T-peel: T-peel properties were tested according to ASTM D1876 standardized test method. Metal substrate was cut in

TABLE 1

Adhesive formulations

| | | Adhesive # (all values in parts by weight) | | | | | | | |
|---|---|---|---|---|---|---|---|---|---|
| | | #1 | #2 | #3 | #4 | #5 | #6 | #7 | #8 |
| Kane Ace[1] | | 48 | 48 | 48 | 48 | 48 | 48 | 48 | 48 |
| Epoxy polyester[2] | | 18.4 | 18.4 | 18.4 | 18.4 | 18.4 | 18.4 | 18.4 | 18.4 |
| Mica[3] | | 1 | 1 | 1 | 1 | 1 | 1 | 1 | 1 |
| CaO2[4] | | 2 | 2 | 2 | 2 | 2 | 2 | 2 | 2 |
| Silica[5] | | 0.3 | 0.3 | 0.3 | 0.3 | 0.3 | 0.3 | 0.3 | 0.3 |
| Dyhard SF[6] | | 3.4 | 3.4 | 3.4 | 3.4 | 3.4 | 3.4 | 3.4 | 3.4 |
| Diuron[7] | | 0.3 | 0.3 | 0.3 | 0.3 | 0.3 | 0.3 | 0.3 | 0.3 |
| Curing Component | Ratio* | | | | | | | | |
| Example 1 | 1.3 | 2 | — | — | — | — | — | — | — |
| Example 2 | 1.0 | — | 2 | — | — | — | — | — | — |
| Example 3 | 2.1 | — | — | 2 | — | — | — | — | — |
| Example 4 | 1.2 | — | — | — | 2 | — | — | — | — |
| Example 5 | 1.2 | — | — | — | — | 2 | — | — | — |
| Example 6 | 1.2 | — | — | — | — | — | 2 | — | — |
| Comparative Example 7 | 1.25** | — | — | — | — | — | — | 2 | — |
| Example 8 | 1.5 | — | — | — | — | — | — | — | 2 |

*Mole ratio of FRJ-425 to amine-containing compound of the present invention for Examples 1 through 6 and 8
**Mole ratio of FRJ-425 to 2,4,6-tris(dimethylaminomethyl)phenol for example 7
[1]Kane Ace MX 153, core-shell poly(butadiene) rubber dispersion (33%) in Epon ® 828 (polyglycidyl ether of Bisphenol A), available from Kaneka Texas Corporation
[2]Prepared from hexahydrophthalic anhydride, Terathane 650 (polytetramethylene ether glycol available from Invista) and Epon 828 (polyglycidyl ether of Bisphenol A available from Hexion Specialty Chemicals, Inc.) as described in U.S. Pat. No. 8,796,361
[3]DakotaPURE ™ 3000, muscovite mica, available from PACER Corporation
[4]Quick Lime, available from Mississippi Lime Corporation
[5]HDK H17 Pyrogenic silica, available from Wacker Chemie AG
[6]Dyhard ® SF 100, dicyandiamide, available from ALZ Chem USA Corporation
[7]Dyhard ® UR 200, Diuron (tradename), [3-(3,4-dichlorophenyl)-1,1-dimethylurea] available from ALZ Chem USA Corporation Test Methods The mechanical performance of the structural adhesives of the present invention, Examples 1-6 and 8, versus the comparative example, Example 7 (a tertiary aminophenol), are shown in Table 2.

Lap shear properties were tested according to ISO 4587 standard test method on 1 mm thick hot dip galvanized (HDG) steel substrate as supplied by Hovelmann & Lueg GmbH, Germany. T-peel properties were tested on 0.7 mm thick hot dip galvanized-steel and electro-galvanized (EZG) steel panels as supplied by ACT Test Panels. Curing conditions for all the testing was 145° C. (293° F.) metal temperature for 10 minutes.

Lap-Shear Testing: 20 mm×90 mm coupons were cut and scribed at one end at 10 mm. The adhesive composition was applied evenly on one of the coupons within the scribed area pairs of 1 inch×4 inch in dimension. A ninety degree bend was at 0.5 inch from one end on a vise so that paired pieces made a T-shaped configuration: ⎤ ⎡, when bonded together. A thin layer of the adhesive composition was applied on the unbent portion of bonding side of one piece. A 0.25 mm diameter glass spacer beads were applied evenly over the total bond area to cover 5% of total bond area. Two pieces were placed together to form a T-shaped configuration known as T-PEEL assembly. Two large binder clips were placed on each side of the T-PEEL assembly to hold it together. Excess squeeze out of adhesive was removed with a spatula prior to baking the assemblies in a preconditioned oven at a specified temperature. The samples were cooled, the binder clips were removed, and any remaining excess squeeze out was sanded. The samples were pulled apart on an INSTRON 5567 at rate of 50 mm per minute. The Instron 5567 calculated results in Newton per mm through an internal computer program.

As shown in Table 2, lap shear improved in adhesives with the use of the curing components of the present invention (Examples 1-6, 8) compared to the use of the tertiary aminophenol of comparative Example 7.

As shown in Table 2, T-peel improved in adhesives with the use of the curing components of the present invention (Examples 1-6, 8) compared to the tertiary aminophenol of comparative Example 7.

TABLE 2

Adhesive Properties

| | | Adhesive # | | | | | | |
|---|---|---|---|---|---|---|---|---|
| | #1 | #2 | #3 | #4 | #5 | #6 | #7 | #8 |
| Lap shear (MPa) | 23.6 | 22.8 | 24.3 | 23.3 | 25.2 | 24.2 | 21.6 | 22.1 |
| T-Peel (N/mm) HDG | 9.1 | 10.3 | 8.7 | 8.6 | 9.9 | 7.2 | 5.6 | 7.1 |
| T-Peel (N/mm) EGZ | 10.5 | 10.2 | 10.6 | 12.5 | 9.4 | 10.7 | 9.2 | 8.0 |

Aspects of the Invention

In the following, some aspects of the present invention are summarized:

1. A curing component comprising a mixture of an amine-containing compound substantially free of hydroxyl functional groups, and a polymeric phenol-containing compound, wherein the amine-containing compound comprises primary and/or secondary amino groups, and wherein the curing component reacts with an epoxy-containing component upon activation from an external energy source.
2. The curing component of aspect 1, wherein the amine-containing compound has an amine equivalent weight of at least 30.
3. The curing component of aspect 1 or 2, wherein the amine-containing compound has the formula (I):

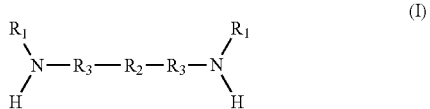

wherein each $R_1$ is independently H or a $C_1$-$C_{18}$ alkyl group; $R_2$ is oxygen, $C_1$-$C_{12}$ divalent alkyl, divalent aromatic, or divalent cycloaliphatic; each $R_3$ is independently absent or $C_1$-$C_4$ divalent alkyl, divalent aromatic, or divalent cycloaliphatic, and/or the formula (II):

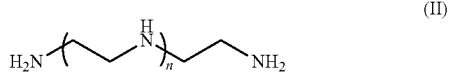

wherein n=1, 2, or 3, and/or
wherein the amine-containing compound comprises a polyetheramine, dipropylenetriamine, or combinations thereof.
4. The curing component of any of the preceding aspects, wherein the polymeric phenol-containing compound has a phenol equivalent weight of at least 62.
5. The curing component of any of the preceding aspects, wherein the polymeric phenol-containing compound comprises a phenol formaldehyde resin.
6. The curing component of any of the preceding aspects, wherein the amine-containing compound and the polymeric phenol-containing compound are present in a molar ratio of from 3:1 to 1:3.
7. The curing component of any of the preceding aspects, wherein the activation from an external energy source comprises thermal heating to a temperature of at least 100° C.
8. An adhesive composition comprising:
   an epoxy-containing component;
   rubber particles having a core-shell structure; and
   a curing component according to any of aspects 1 to 7.
9. The adhesive composition of aspect 8, wherein the epoxy-containing component is present in an amount of from 50% to 90% by weight based on total composition weight.
10. The adhesive composition of aspect 8 or 9, wherein the curing component is present in an amount of from 1% to 10% by weight based on total composition weight.
11. The curing component or the adhesive composition of any of the preceding aspects, wherein the amine-containing compound is substantially free of tertiary amine.
12. The adhesive composition of any of aspects 8-11, further comprising a secondary latent curing catalyst.
13. The curing component or the adhesive composition of any of the preceding aspects, wherein the curing component or the adhesive composition, respectively, is substantially free of solvent.
14. The curing component or the adhesive composition of any of the preceding aspects, wherein the polymeric phenol-containing compound blocks the amine-containing compound from reacting with the epoxy-containing component in the absence of activation from the external energy source.
15. A method for forming bond between two substrates comprising:
   applying the adhesive composition of any of aspects 8-14 to a first substrate;
   contacting a second substrate to the adhesive composition such that the adhesive composition is located between the first substrate and the second substrate; and
   applying an external energy source to cure the adhesive composition.

It will be appreciated by skilled artisans that numerous modifications and variations are possible in light of the above disclosure without departing from the broad inventive concepts described and exemplified herein. Accordingly, it is therefore to be understood that the foregoing disclosure is merely illustrative of various exemplary aspects of this application and that numerous modifications and variations can be readily made by skilled artisans which are within the spirit and scope of this application and the accompanying claims

We claim:

1. A curing component comprising a mixture of an amine-containing compound having a structure of formula (I):

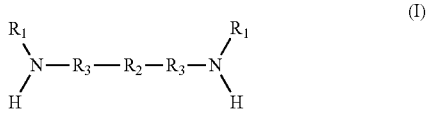

wherein each $R_1$ is independently H or a $C_1$-$C_{18}$ alkyl group; $R_2$ is oxygen; each $R_3$ is independently absent or $C_1$-$C_4$ divalent alkyl or divalent cycloaliphatic, wherein the amine-containing compound comprises primary and/or secondary amino groups and tertiary amines in an amount of less than 2% by weight based on total weight of the amine-containing compound and is substantially free of hydroxyl functional groups, and a polymeric phenol-containing compound; wherein the curing component is ground to a D97 of no more than 500 μm using an air classifying mill; and wherein the amine-containing compound is blocked by the polymeric phenol-containing compound in the absence of activation from an external energy source.

2. The curing component of claim 1, wherein the amine-containing compound has an amine equivalent weight of at least 30.

3. The curing component of claim 1, wherein the amine-containing compound further comprises dipropylenetriamine.

4. The curing component of claim 1, wherein the polymeric phenol-containing compound has a phenol equivalent weight of at least 62.

5. The curing component of claim 1, wherein the polymeric phenol-containing compound comprises a phenol formaldehyde resin.

6. The curing component of claim 1, wherein the mixture is substantially free of solvent.

7. An adhesive composition comprising:
an epoxy-containing component;
rubber particles having a core-shell structure; and
the curing component of claim 1.

8. The adhesive composition of claim 7, wherein the epoxy-containing component is present in an amount of from 50% to 90% by weight based on total composition weight.

9. The adhesive composition of claim 7, wherein the curing component is present in an amount of from 0.2% to 15% by weight based on total composition weight.

10. The adhesive composition of claim 7, further comprising a secondary latent curing catalyst.

11. The adhesive composition of claim 7, wherein the adhesive composition is substantially free of solvent.

12. The adhesive composition of claim 7, wherein the polymeric phenol-containing compound blocks the amine-containing compound from reacting with the epoxy-containing component in the absence of activation from the external energy source.

13. A method for forming a bond between two substrates comprising:
applying the adhesive composition of claim 7 to a first substrate;
contacting a second substrate to the adhesive composition such that the adhesive composition is located between the first substrate and the second substrate; and
applying an external energy source to cure the adhesive composition.

14. The curing component of claim 1, wherein the amine-containing compound and the polymeric phenol-containing compound are present in a molar ratio of from 1.5:1 to 1:3.

15. The method of claim 13, wherein the external energy source comprises thermal heating to a temperature of at least 100° C.

16. A curing component comprising a mixture of an amine-containing compound comprising an alkyl polyetheramine and/or a cycloaliphatic polyetheramine, wherein the amine-containing compound comprises primary and/or secondary amino groups and tertiary amines in an amount of less than 2% by weight based on total weight of the amine-containing compound and is substantially free of hydroxyl functional groups, and a polymeric phenol-containing compound comprising a phenol-equivalent weight of at least 124; wherein the curing component is ground to a D97 of no more than 500 μm using an air classifying mill; and wherein the amine-containing compound is blocked by the polymeric phenol-containing compound in the absence of activation from an external energy source.

17. The curing component of claim 16, wherein the amine-containing compound has an amine equivalent weight of at least 30.

18. The curing component of claim 16, wherein the amine-containing compound further comprises dipropylenetriamine.

19. The curing component of claim 16, wherein the polymeric phenol-containing compound comprises a phenol formaldehyde resin.

20. The curing component of claim 16, wherein the mixture is substantially free of solvent.

21. An adhesive composition comprising:
an epoxy-containing component;
rubber particles having a core-shell structure; and
the curing component of claim 16.

22. The adhesive composition of claim 21, wherein the epoxy-containing component is present in an amount of from 50% to 90% by weight based on total composition weight.

23. The adhesive composition of claim 21, wherein the curing component is present in an amount of from 0.2% to 15% by weight based on total composition weight.

24. A method for forming a bond between two substrates comprising:
applying the adhesive composition of claim 21 to a first substrate;
contacting a second substrate to the adhesive composition such that the adhesive composition is located between the first substrate and the second substrate; and
applying an external energy source to cure the adhesive composition.

25. A curing component comprising a mixture of an amine-containing compound having a structure of formula (I):

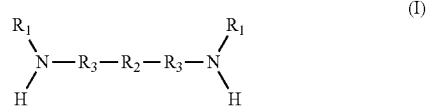

wherein each $R_1$ is independently H or a $C_1$-$C_{18}$ alkyl group; $R_2$ is oxygen; each $R_3$ is independently absent or $C_1$-$C_4$ divalent alkyl or divalent cycloaliphatic, wherein the amine-containing compound comprises primary and/or secondary amino groups and tertiary amines in an amount of less than 2% by weight based on total weight of the amine-containing compound and is substantially free of hydroxyl functional groups, and a polymeric phenol-containing compound; wherein the curing component is a powder having a D97 particle size of no more than 500 μm; and wherein the amine-containing compound is blocked by the polymeric phenol-containing compound in the absence of activation from an external energy source.

26. The curing component of claim 25, wherein the amine-containing compound has an amine equivalent weight of at least 30 and/or the polymeric phenol-containing compound has a phenol equivalent weight of at least 62.

27. The curing component of claim 25, wherein the amine-containing compound further comprises dipropylenetriamine and/or the polymeric phenol-containing compound comprises a phenol formaldehyde resin.

28. The curing component of claim 25, wherein the amine-containing compound and the polymeric phenol-containing compound are present in a molar ratio of from 1.5:1 to 1:3.

29. An adhesive composition comprising:
an epoxy-containing component;
rubber particles having a core-shell structure; and
the curing component of claim 25.

30. The adhesive composition of claim 29, wherein the epoxy-containing component is present in an amount of from 50% to 90% by weight based on total composition weight and/or wherein the curing component is present in an amount of from 0.2% to 15% by weight based on total composition weight.

31. A method for forming a bond between two substrates comprising:
applying the adhesive composition of claim 29 to a first substrate;
contacting a second substrate to the adhesive composition such that the adhesive composition is located between the first substrate and the second substrate; and
applying an external energy source to cure the adhesive composition.

32. A curing component comprising a mixture of an amine-containing compound comprising an alkyl polyetheramine and/or a cycloaliphatic polyetheramine, wherein the amine-containing compound comprises primary and/or secondary amino groups and tertiary amines in an amount of less than 2% by weight based on total weight of the amine-containing compound and is substantially free of hydroxyl functional groups, and a polymeric phenol-containing compound comprising a phenol-equivalent weight of at least 124; wherein the curing component is a powder having a D97 particle size of no more than 500 μm; and wherein the amine-containing compound is blocked by the polymeric phenol-containing compound in the absence of activation from an external energy source.

33. The curing component of claim 32, wherein the amine-containing compound has an amine equivalent weight of at least 30.

34. The curing component of claim 32, wherein the amine-containing compound further comprises dipropylenetriamine and/or the polymeric phenol-containing compound comprises a phenol formaldehyde resin.

35. An adhesive composition comprising:
an epoxy-containing component;
rubber particles having a core-shell structure; and
the curing component of claim 32.

36. The adhesive composition of claim 35, wherein the epoxy-containing component is present in an amount of from 50% to 90% by weight based on total composition weight and/or the curing component is present in an amount of from 0.2% to 15% by weight based on total composition weight.

37. A method for forming a bond between two substrates comprising:
applying the adhesive composition of claim 35 to a first substrate;
contacting a second substrate to the adhesive composition such that the adhesive composition is located between the first substrate and the second substrate; and
applying an external energy source to cure the adhesive composition.

* * * * *